July 17, 1923. Re. 15,653

C. T. ALLCUTT

LIGHTNING ARRESTER

Original Filed Sept. 1, 1917

WITNESSES:

A. L. Jeffrey

H. C. Bierman

INVENTOR

Chester T. Allcutt

BY

Wesley G. Carr

ATTORNEY

Reissued July 17, 1923. Re. 15,653

UNITED STATES PATENT OFFICE.

CHESTER T. ALLCUTT, OF WILKINSBURG, PENNSYLVANIA, ASSIGNOR TO WESTINGHOUSE ELECTRIC AND MANUFACTURING COMPANY, A CORPORATION OF PENNSYLVANIA.

LIGHTNING ARRESTER.

Original No. 1,361,801, dated December 14, 1920, Serial No. 189,348, filed September 1, 1917. Application for reissue filed November 14, 1922. Serial No. 600,972.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Lightning Arresters, of which the following is a specification.

My invention relates to molded articles composed partly of electrical conducting material, such as comminuted carbon in the form of graphite or some other material capable of being molded, and an electrical insulating material known as a phenolic condensation product, such as bakelite.

This invention has been developed with particular reference to articles having certain portions that are of relatively high electrical conductivity and other portions that adequately insulate these conducting portions while serving as rigid mechanical supports for them in order that the articles may be handled expeditiously without exercising undue care and be subjected to severe strains and stresses without undergoing deterioration.

In the present instance, I describe my invention as utilized in manufacturing a portion of a lightning arrester in which the electrodes thereof are separated from, and maintained electrically independent of, each other by reason of a molded article embodying my invention.

In excess-voltage protective devices, and more especially in protective devices for telephone or telegraph service, it is customary to separate the electrodes of such devices by means of insulating spacers that are perforated in any suitable manner to provide an intermediate air-gap. After an arrester of this type has been subjected to a few discharges, it is usually of no further service as a protective means until certain replacements have been made, thereby restoring it to its original condition. One defect of such an arrester is that the spacer loses its insulating property. Also, finely divided particles, loosened from the electrodes by the discharge, frequently lodge in the air-gap between the electrodes, thereby grounding the associated circuit.

In an arrester comprising an article of my invention, the electrodes may be spaced from one another without employing an insulating spacer, since the insulating portion thereof, or that portion made of bakelite, serves as a means for insulating the electrodes from each other and, at the same time, as a mechanical support for the conducting portion that is integrally formed therewith. Moreover, these molded articles may be readily manufactured in large quantities without performing any expensive labor on them, such as machine work, in order to insure the production of air-gaps of uniform size between the conducting portions thereof and the electrodes with which the molded articles are to be associated. These molded articles do not undergo any serious deterioration when in service, because the lines of electrical demarcation between the conducting and insulating portions and the integral mechanical connection are continually maintained. Furthermore, the insulating member is never subjected to the action of an electrical discharge and the deterioration resulting therefrom.

For a better understanding of the nature and scope of my invention, reference may be had to the following description and the accompanying drawing, in which Figure 1 is a front view of a protective device comprising an article manufactured in accordance with my invention.

Figure 1:
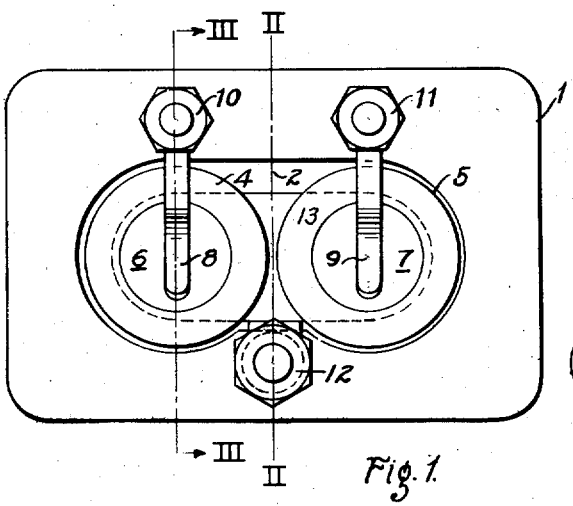

Referring to Fig. 1, an insulating block 1 is provided with a recess 2 in which electrodes 4 and 5 are seated. Conducting portions 6 and 7 of resistor material of the electrodes 4 and 5, respectively, are engaged by spring clips 8 and 9 that are, in turn, supported from terminals 10 and 11. The terminals 10 and 11 are adapted to be connected to conductors of the electrical circuit which it is desired to protect against excess voltages by means of the lightning arrester. A terminal 12, connected to a conducting plate 13, which is retained in the recess 2, serves to provide a ground connection for the lightning arrester.

Figure 2:
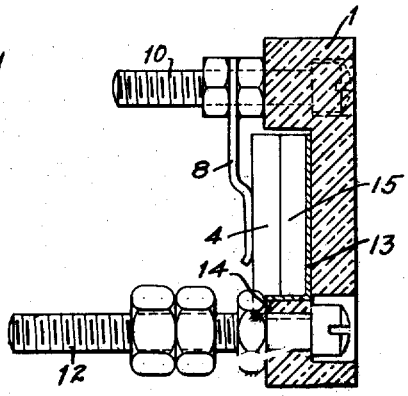
Figs. 2 and 3 are views, partially in elevation and partially in section, taken along the lines II—II and III—III, respectively, of Fig. 1.

Referring to Fig. 2, it will be noted that the conducting plate 13 is connected, by means of a clip 14, to the terminal member 12 and that an electrode 15, associated with the electrode 4, is maintained in electrical contact with the conducting plate 13 by means of the pressure exerted by the spring clip member 8. A conducting electrode, like electrode 15, co-operates with the electrode 5 and is maintained in contact with the plate 13 by the clip member 9.

Figure 3:
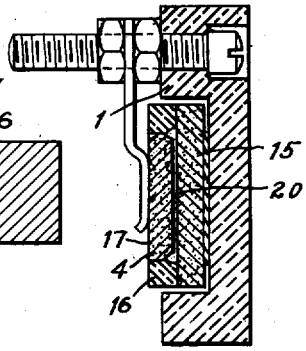
Figure 4:
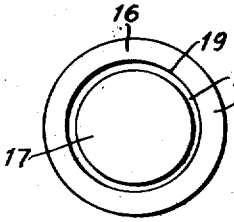
Fig. 4 is a front view of a molded article constructed in accordance with my invention.
Figure 6:
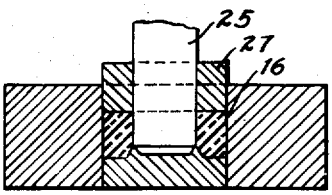

In Figs. 3 and 4, the electrode 4 is shown as comprising an insulating portion 16 and a central conducting portion 17. A channel or groove 18 is formed along the line of separation between the portions 16 and 17, the outer periphery 19 of which is spaced a sufficient distance from the outer edge of the conducting portion 17 to preclude any electrical discharges from coming into contact with the insulating portion of the electrode which would, in time, decompose it and thereby destroy its insulating properties. It will be understood that the inner surface of the conducting portion 17 is countersunk with reference to the inner surface of the insulating portion 16. As a consequence, a gap 20 is formed between the opposing surfaces of the conducting portion 17 and the electrode 15. This gap is maintained unobstructed, since all loosened particles from the electrodes are received in the groove 18. Thus, the continuous operation of the arrester is insured.

Figure 5:
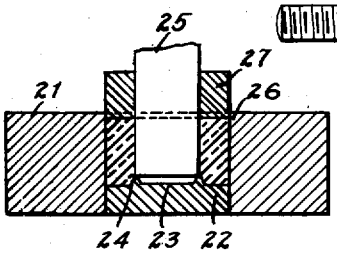
Figs. 5, 6, 7 and 8 are views showing successive stages in the manufacture of the article shown in Fig. 4 and are illustrative of a method of manufacturing other articles in accordance with my invention.
Figure 7:
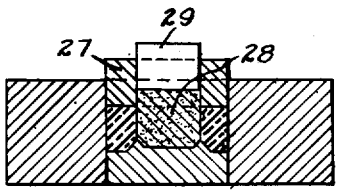

The molded electrode 4 may be manufactured by the use of a mold 21, as shown in Fig. 5, that is provided with an opening of substantially the same size as the article to be molded. The bottom of the opening is provided with a lower surface 22 and with an upper surface 23 that is separated from the former by means of an upwardly-projecting lip 24. A plunger 25 having, in general, the shape shown in the drawing is first inserted into the opening in the mold. An insulating molding mixture 26, comprising bakelite suitably combined with a filler, such as wood flour, is then poured into the annular opening. An annular plunger 27, embracing the plunger 25, is pressed downwardly in order to compress the bakelite material 26 to such a degree as will insure maintenance of its shape after the plunger 25 is withdrawn from the mold. It is to be understood that this operation is effected while the mold is heated to such degree as to make the molding mixture 26 slightly plastic. The plunger 25 is then withdrawn from the mold and a mixture 28 is admitted into the space formerly occupied by it, as shown in Fig. 7. The mixture 28 comprises bakelite and a comminuted conducting material which may be graphite, lamp-black or any other suitable material. A plunger 29, equal in diameter to the plunger 25 and equal in length to the annular plunger 27 is then inserted, as shown in Fig. 7. The mold is then placed in a hot press and the material is subjected to the combined action of heat and pressure, which is necessary to properly cure the phenolic condensation product or bakelite.

Figure 8:
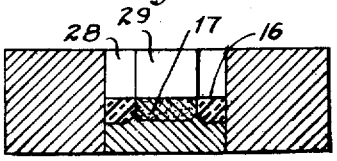

By reason of the bakelite in the mixtures 26 and 28, an autogenous joint is secured between the compressed conducting portion 17 of resistor material and the insulating portion 16, as shown in Fig. 8. The insulating portion 16 and the conducting portion 17 are joined to one another by means of a multitude of connections that result from the simultaneous "setting" of the bakelite in the two separate portions of the article. In this manner, the insulating portion 16 serves to mechanically support the conducting portion 17, while, at the same time, the two portions are maintained electrically independent of each other.

While I have shown and described a single article only involving my invention and a method for manufacturing the same, it will be understood that I desire such limitations only to be imposed upon my invention as are pointed out in the appended claims.

I claim as my invention:

1. An article of manufacture comprising an insulating portion containing a phenolic condensation product and an electrical conducting portion molded integrally therewith and comprising a comminuted electrical conducting material.

2. An article of manufacture comprising an insulating portion containing bakelite and a conducting portion molded integrally therewith and comprising comminuted conducting carbon.

3. An article of manufacture comprising an insulating portion containing a phenolic condensation product and an electrical conducting portion molded integrally therewith and comprising comminuted conducting carbon mixed with a phenolic condensation product.

4. An article of manufacture comprising an insulating portion containing bakelite and an electrical conducting portion comprising comminuted graphite mixed with bakelite.

5. An article of manufacture comprising an insulating portion containing a phenolic condensation product and a conducting portion molded integrally therewith and comprising a mixture of comminuted electrical conducting material and a phenolic condensation product.

6. The method of forming a member for a lightning arrester which consists in molding an insulating support containing a phenolic condensation product and thereafter molding integrally therewith an electrical conducting portion comprising a comminuted conducting material and a binder therefor that serves to autogenously unite with said insulating support.

7. The method of forming an article of manufacture which comprises the separate placing in a mold of a mass containing a phenolic condensation product and thereafter a mass comprising a mixture of comminuted electrical conducting material and a phenolic condensation product, the whole being subjected to heat and pressure in order to autogenously unite said two masses to each other.

8. The method of forming an article of manufacture which comprises the separate placing in a mold of a mass containing bakelite and thereafter a mass comprising a mixture of bakelite and graphite, the whole being subjected to heat and pressure in order to form an autogenous union between said two masses of material.

9. A protector comprising a pair of electrodes, one of said electrodes comprising a conducting member and the other comprising a non-conducting portion and a conducting portion autogenously connected thereto, the surface of said conducting portion being countersunk relatively to the corresponding surface of the insulating portion and being separated therefrom by means of a groove.

10. A protector comprising a pair of electrodes, one of which comprises a conducting member and the other a non-conducting molded portion and a conducting molded portion that are autogenously joined to each other, the opposing conducting surfaces of said electrodes, when placed in opposition to each other, being in relatively different planes and a groove being formed along the line of separation between the conducting and non-conducting portions of said second electrode in order to preclude electrical discharges from coming into contact with the non-conducting portion of said second electrode.

11. A discharge electrode for a lightning arrester comprising a plurality of refractory conducting particles held in a binder of phenolic condensation product.

12. A discharge electrode for a lightning arrester comprising a plurality of carbon particles held in a binder of phenolic condensation product.

13. In a protective device, a discharge gap comprising two opposing and relatively spaced members, each of which comprises a plurality of refractory conducting particles held in a binder of phenolic condensation product.

14. In a protective device, a discharge gap comprising two opposing and relatively spaced members, each of which comprises a plurality of carbon particles held in a binder of phenolic condensation product.

15. A resistance element, comprising a molded mixture of a finely divided conducting material and a synthetic gum which hardens in molding.

16. A resistance element, comprising a molded mixture of finely divided graphite and a synthetic gum which hardens in molding.

17. A resistance element, comprising a molded mixture of finely divided graphite and bakelite type gum.

18. A resistance element, comprising a bakelite bar having finely divided graphite embedded therein.

19. A composition of matter comprising a homogeneous mixture of non-conducting moldable material and finely divided conducting material.

20. A composition of matter comprising a homogeneous mixture of non-conducting moldable material and finely divided graphite.

In testimony whereof, I have hereunto subscribed my name this 6th day of November, 1922.

CHESTER T. ALLCUTT.